March 31, 1953     C. R. PATON     2,633,203
ARTICULATED MOTOR VEHICLE FRAME STRUCTURE
Filed Feb. 24, 1947     4 Sheets-Sheet 1

INVENTOR.
CLYDE R. PATON.
BY
*Wallace P. Lamb*
ATTORNEY.

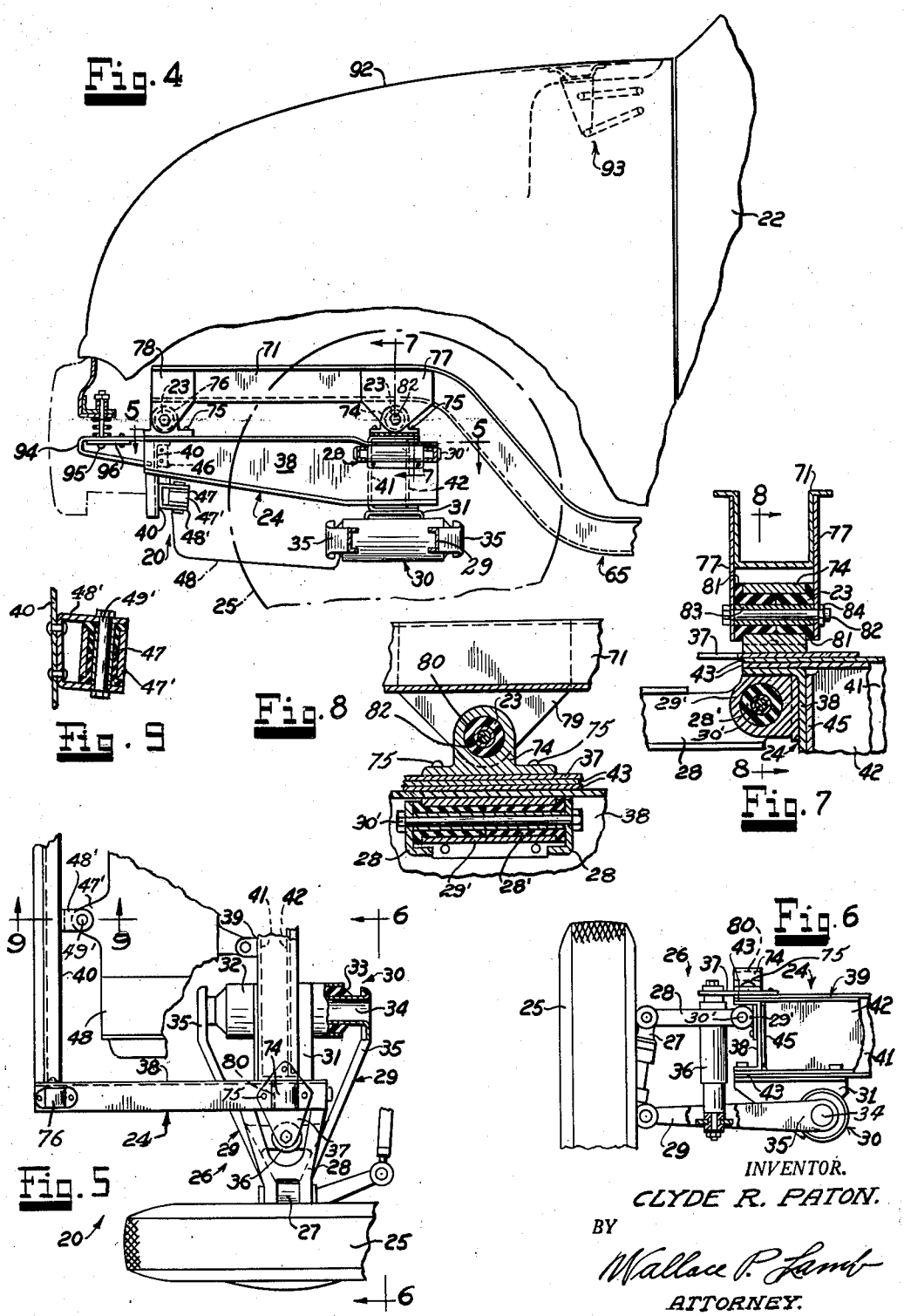

March 31, 1953 C. R. PATON 2,633,203
ARTICULATED MOTOR VEHICLE FRAME STRUCTURE
Filed Feb. 24, 1947 4 Sheets-Sheet 3
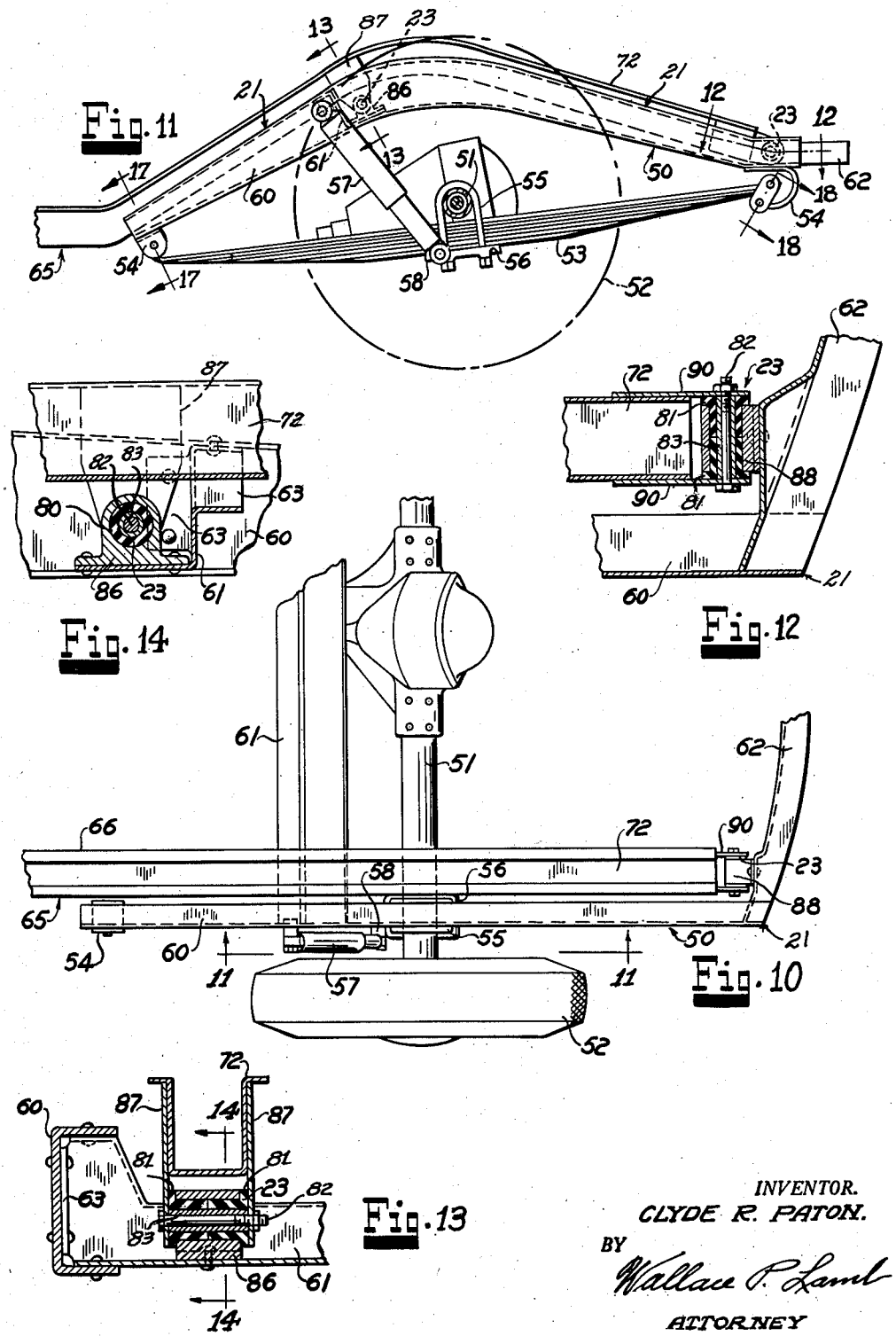
INVENTOR.
CLYDE R. PATON.
BY
Wallace P. Lamb
ATTORNEY

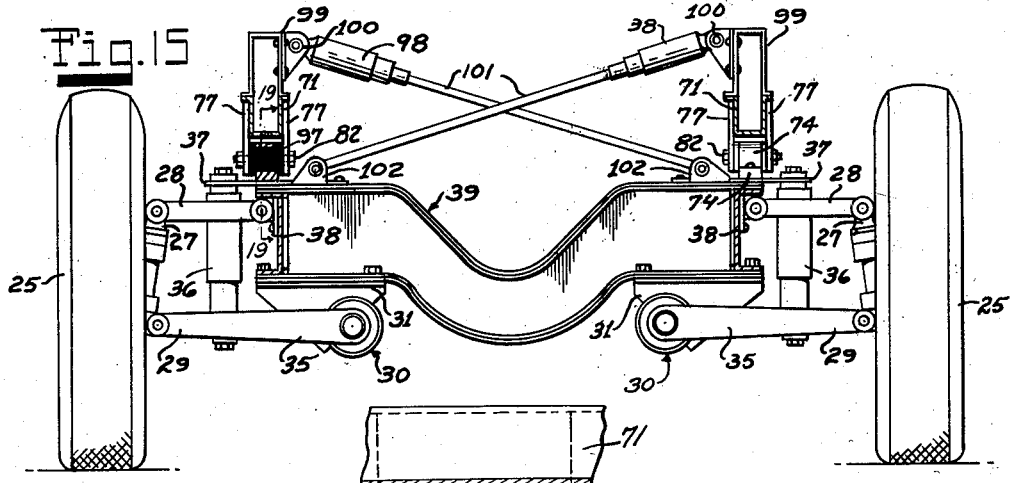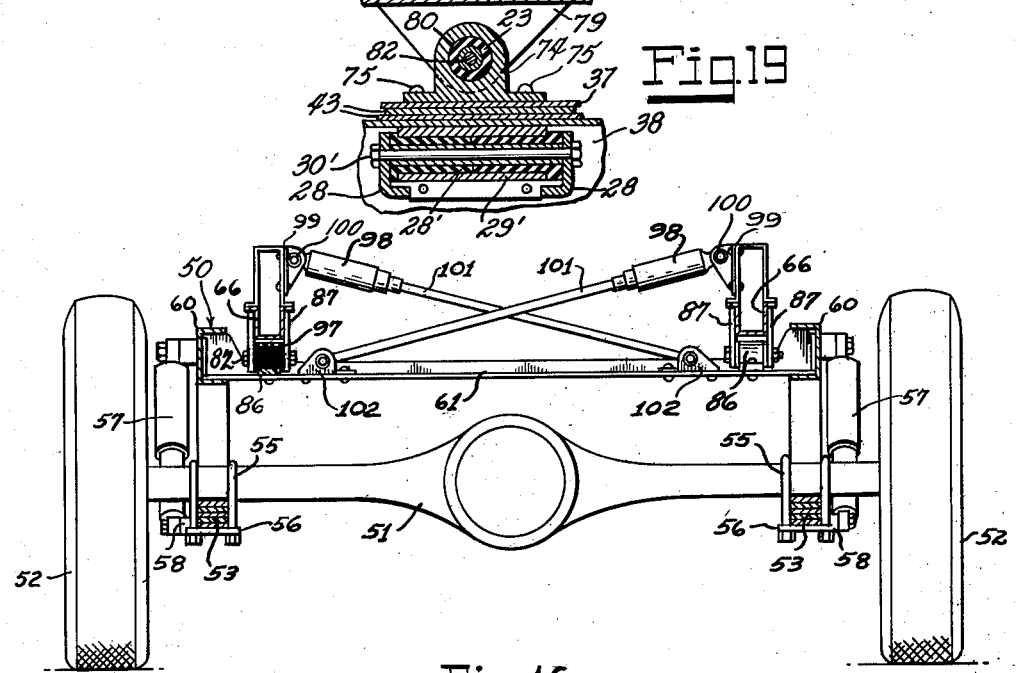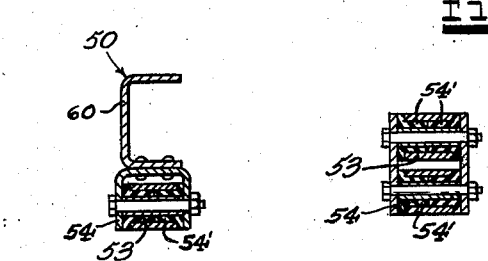

Patented Mar. 31, 1953

2,633,203

UNITED STATES PATENT OFFICE 2,633,203

ARTICULATED MOTOR VEHICLE FRAME STRUCTURE

Clyde R. Paton, Bloomfield Village, Mich.

Application February 24, 1947, Serial No. 730,252

2 Claims. (Cl. 180—12)

This invention relates generally to motor vehicles and more particularly to chassis frames therefor.

As is well known, in motor vehicles of the past, substantially all units thereof, such as the body, power plant, front and rear wheels, etc. have been mounted on or suspended from a common or single chassis frame. In vehicles of this construction, the problem of preventing transmission through the frame of road shocks and of engine vibrations to the body has been ever present. This includes audible, as well as inaudible, vibrations. Recently, it has been found desirable to use a so-called integral body and frame structure comprising an upper body and an underbody frame welded together. While this type of structure is desirable from the standpoint of strength and rigidity, its integral construction makes it more subject to vibration transmission than the earlier type of construction in which the body was bolted to a frame on pads interposed therebetween. To prevent transmission of roads shocks and of engine vibrations to the body many devices, such as wheel suspension mechanisms, shock absorbers, etc. have been used with some success in dampening vertical vibrations, but with little or no success in dampening lateral and torsional vibrations. This has resulted, among other things, in the use of heavier than needed chassis frames in an effort to decrease lateral and torsional vibrations. Chassis frames should be of a certain desired strength and rigidity at the front and rear wheels where most of the load is concentrated, but beneath the body, particularly in integral frame and closed body structures, the same strength and rigidity of frame is not needed because of the rigidity added by the framework of the body. However, because of the impracticability of making the longitudinal frame members of heavy gauge in the vicinity of the wheels and of reduced or lighter gauge under the body, heavier than needed underbody frames have been used. This added surplus frame weight does not appreciably resist torsional vibrations, but instead more noticeably increases costs both of manufacture and operation of motor vehicles.

Accordingly, it is an object of the present invention to provide an improved motor vehicle having improved riding qualities together with decreased weight and accompanyng decrease in cost of manufacture and operation.

Another object of the invention is to provide an improved motor vehicle construction of a character and arrangement to suppress noise and vibrations reaching the passengers.

Another object of the invention is to provide an improved motor vehicle chassis construction which makes it practical to provide and use an underbody frame no heavier than needed for rigid construction.

Another object of the invention is to provide an improved motor vehicle in which transmission of road shock and engine vibrations from the front and rear ends of the vehicle to the body and to each other is substantially eliminated.

Another object of the invention is to provide new and improved motor vehicle chassis of a character such that large front and rear end units or assemblies may be readily attached to and/or detached from the body.

Another object of the invention is to effect an appreciable saving in cost of assembling motor vehicles by making it possible to increase the amount of sub-assembly work with, of course, decrease in expensive final assembly operations.

Other objects of the invention will become apparent from the following detailed description taken in connection with the accompanying drawings in which:

Figure 4 is an enlarged fragmentary side view of the front end of the vehicle of Figures 1 and 2.

Figure 5 is a fragmentary plan view of a unitary front end chassis taken along the line 5—5 of Figure 4.

Figure 6 is a fragmentary end view of the chassis taken along the line 6—6 of Figure 5.

Figure 7 is a cross sectional view of the front end of the vehicle chassis, taken along the line 7—7 of Figure 4.

Figure 8 is a sectional view of the chassis, taken along the line 8—8 of Figure 7.

Figure 9 is a detail sectional view of an engine mounting of the vehicle taken along the line 9—9 of Fig. 5.

Figure 10 is an enlarged fragmentary plan view of certain rear end structure of the vehicle of Figures 1 and 2.

Figure 11 is a side view of the rear end of the vehicle taken along the line 11—11 of Figure 10.

Figure 12 is a sectional view of the chassis frame, taken along the line 12—12 of Figure 11, Figure 13 is a sectional view of the chassis frame, taken along the line 13—13 of Figure 11.

Figure 14 is a sectional view of the chassis frame taken along the line 14—14 of Figure 13.

Figure 15 is a cross sectional view of a motor vehicle chassis taken adjacent the front end thereof showing a modification of the invention.

Figure 1:
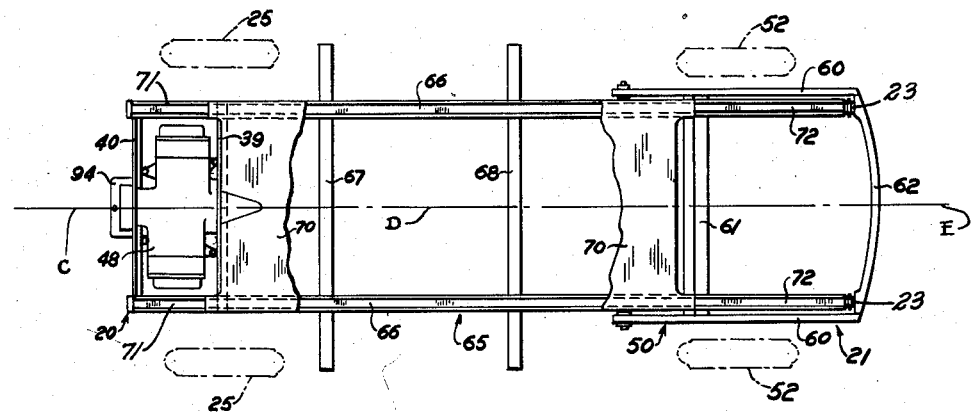
Figure 1 is a plan view substantially of a motor vehicle embodying features of the present invention.

Figure 16 is a cross sectional view of the vehicle of Figure 15, taken adjacent the rear end thereof and Figures 17 and 18 are cross sectional views showing certain details common to the preferred and modified forms and taken respectively along lines 17—17 and 18—18 of Fig. 11, and Fig. 19 is a sectional view, taken along the line 19—19 of Fig. 15.

Referring to the drawings by characters of reference, the present motor vehicle comprises, in general, a front end chassis 20, a rear end chassis 21 and a body 22. The front end chassis and the rear end chassis are separate units spaced apart, with the body 22 supported by and suspended therebetween. These chassis units and the body are connected together as an articulated structure, the connections including resilient or rubber insulators 23 to dampen vibrations so that transmission of vibrations from the chassis units to the body and to each other is substantially decreased.

The front chassis unit 20 comprises in general, a power plant supporting and wheel suspension frame 24, a pair of steerable ground wheels 25 and individual wheel suspension mechanisms, designated generally by the numeral 26. The wheels 25 each have the usual steering knuckle bracket 27 to which is pivoted the outer ends of upper and lower wheel suspension arms or connectors 28 and 29 respectively which connect the wheels and the frame 24 together. Each wheel suspension mechanism 26 includes a resilient connecting element 30, connecting lower suspension arms 29 to the frame 24. These elements 30, which may be of any suitable type, may be mounted on the frame 24 by brackets 31. As shown more clearly in Figure 5, each of the elements 30 includes a cylindrical casing 32 encasing a rubber sleeve 33 bonded thereto and to an inner metallic tube 34 to the outer ends of which are respectively secured the inner forked ends, as at 35, of the wheel suspension arms 29. Also, the upper wheel suspension arms 28 are each insulated from the chassis frame 24 by resilient insulators 28', preferably rubber sleeves (see Figures 7 and 8). These rubber sleeves 28' are interposed between the inner ends of the arms 28 and the frame 24. Preferably, the rubber sleeves 28' are held in hangers 29' which are rigidly secured to the sides of the frame. Bolts 30', received in sleeves 28', pivotally connect the arms 28 and frame 24 together and hold the rubber sleeves under compression. These rubber sleeves 28' insulate the front chassis frame from vibrations and suppress noise which would otherwise be discernible to occupants of the vehicle. A shock absorber 36 may be provided between each of the front wheels 25 and the frame 24. The shock absorber 36 may be attached at its upper end to a plate-like bracket 37 secured to the frame 24 and may be attached at its lower end to the wheel suspension arms 29.

The front chassis frame 24 comprises a pair of longitudinally extending side frame members 38, a rear cross member 39 and a front cross member 40. These frame members 38, 39 and 40 may be of channel form and may be welded or be otherwise suitably secured together. The rear cross member 39 extends between and connects the front wheels 25 together through the wheel suspension mechanisms 26. This cross member 39 should be of rigid, strong construction and therefore preferably comprises an outer channel member 41 and an inner channel member 42 welded together at their flanges with the webs vertical and in spaced horizontal relation providing a closed or box-like rigid section. As shown in Figures 6 and 7, the upper and lower flanges of the cross member channels 41, 42 are extended at the ends, as at 43, to lie flat against the upper end lower flanges of the frame side members 38 to which they may be welded. Flanged extensions 45 of the web of the cross member inner channel 42 may be welded or be otherwise suitably secured to the webs of the side frame members 38 for increased frame rigidity. The front cross member 40 may be of Z-section having end web flanges 46 riveted, welded or otherwise suitably secured to the webs of the side frame members 38. This front cross member 40 is preferably located adjacent the forward ends of the side frame members 38. On the front chassis frame 24 may be mounted the power plant including an engine 48 and such other associated apparatuses and devices as may be desired. The power plant is supported on resilient mountings or insulators 47, preferably rubber sleeves interposed between engine lugs 47' and frame supported hangers 48'. Bolts 49' extending through the rubber sleeves 47, attach the power plant to the hangers 48' for relative movement therebetween yieldably opposed by the resilient mountings.

The rear end chassis unit 21 comprises, in general, a wheel suspension frame 50, a rear axle housing 51, rear ground wheels 52 and wheel suspension springs 53. The wheels 52 may be suspended from the frame 50 by the conventional elliptical springs 53 connected at their ends to and adjacent the ends of the frame 50 by hangers 54. U-bolts 55 and plates 56 may be used to attach the springs 53 to the rear axle housing 51. Any other suitable wheel suspension mechanism may be used, if desired. To aid in decreasing transmission of vibrations, originating at the rear wheels, to the rear chassis frame 50, I mount the ends of the springs 53 in vibration insulators 54', preferably rubber sleeves, (see Figs. 17 and 18). A shock absorber 57 may be provided adjacent each rear wheel, connected at its upper end to the frame 50 and connected at its lower end to a projection 58 on the U-bolt plate 56 (see Figure 11).

The rear chassis frame 50 comprises a pair of longitudinally extending, side frame members 60, a front cross member 61 and a rear cross member 62. Preferably, the side frame members 60 and the rear cross member 62 of the rear chassis 50 are of channel section, welded or otherwise suitably secured together. The front cross member 61 of the rear chassis may be of Z-section or of any other suitable section. As shown, this front cross member 61 is located rearwardly of the forward ends of the frame side members 60, preferably just forward of the rear axle housing 51 (see Figs. 10 and 11). Opposite ends of the front cross member 61 position in the channel side frame members 60, as shown in Fig. 13 and may be riveted, welded or be otherwise suitably secured to the top and bottom flanges of the side frame members 60. Also, end flanges 63, continuations of the web of the front cross member 61 may be secured to the webs of the side frame members 60 for increased frame rigidity.

Referring now to the body 22, although a passenger type of vehicle body is shown in the drawings, it will be understood that any type or style of body may be used. The present body 22 includes an integral underbody frame 65 comprising, longitudinal side frame members 66, a front cross member 67 and a rear cross member 68. The front cross member 67 is located preferably adjacent the front of the passenger compartment rearwardly of the front end chassis 20 and the rear cross member 68 is preferably spaced forwardly of the rear chassis unit 21. These frame members 66, 67 and 68 are rigidly secured together, preferably by welding. Secured to the upper flanges of the underbody frame members 66, 67 and 68 is a sheet steel body floor pan 70 (see Figure 1). The floor pan 70 adds rigidity to the underbody frame and is preferably welded thereto. The floor pan 70 terminates at its front edge adjacent the front chassis rear cross member 39 and terminates at its rear edge adjacent the rear chassis front cross member 61. It is to be understood that there are no body cross members or other underbody frame structure connecting the frame side members 60 forwardly or rearwardly of the floor pan 70. Thus, the body 22 has a pair of shaft-like, frame extensions 71, extending forwardly of the body and has a similar pair of shaft-like, frame extensions, extending rearwardly from the body. These extensions 71, 72 are sufficiently spaced apart to receive all apparatus, devices, parts, etc. carried by the chassis frames required to position in the horizontal plane of and between the front and rear body extensions, thus making it possible to wheel the front and rear chassis units 20, 21 respectively into place for connection with the frame extensions 71, 72.

The front end body frame extensions 71 extends forwardly and upwardly respectively and immediately to overlie the side frame members 38 of the front chassis frame 24. Mounted on the front chassis frame 24 there is a pair of oppositely disposed, laterally positioned connector members or hanger brackets 74 which are located respectively at the ends of the rear cross member 39. In the present arrangement, the bracket hangers 74 rest on the shock absorber bracket plates 37 and are secured to the upper flanges of the frame side members 38 by rivets 75. Similar, front connector members or hanger brackets 76 are mounted on and secured to the upper flanges of the frame side members 38 preferably adjacent the front cross member 40. Carried by the forwardly extended side frame portions 71, rear oppositely disposed connector members or hangers 77 and front oppositely disposed connector members or hangers 78 cooperate respectively with the rear and front hangers 74, 76 carried by the front chassis frame 24. These cooperating hangers connect the front chassis 20 and the body 22 together, separated by the resilient insulators 23. The hanger brackets 77, 78 may each comprise a pair of spaced plates 79 welded or otherwise suitably secured respectively to opposite sides of the frame extensions 71.

Each of the resilient connections between the front chassis frame 24 and the underbody frame extensions 71 being substantially the same, a detailed description of one is deemed sufficient. With particular reference to Figures 7 and 8, the chassis frame hanger brackets 74 of each laterally disposed pair have aligning bores 80 in which the insulators 23 are positioned, these insulators 23 preferably comprising a pair of end to end rubber sleeves having flanged outer ends 81 abutting opposite outer sides of the hanger bracket 74. A bolt 82 extending through aligning holes in the body frame hangers 77 and through a metallic sleeve 83 in the aligned rubber insulator sleeves is drawn down by a nut 84 securing the parts together. This nut 84 is tightened sufficiently to displace the rubber of the insulator sleeves, crowding the rubber into the bore of the hanger 74, displacement of the rubber being limited by the metallic sleeve 83. The rubber is displaced sufficiently to achieve the effect of a bonded relationship between the heads 81 of the rubber sleeves and the hangers 77 and between the tubular body portions of the rubber sleeves and the chassis hanger 74. This provides for the rubber insulators to be in shear or in compression or both upon torsional vibratory action of the front chassis. In the present construction, the insulators 23 are mounted so that their longitudinal axes extend transversely of the vehicle, substantially on the horizontal. However, if desired, these insulators 23 may be arranged with their longitudinal axes angularly disposed. It will now be seen, that I have suspended the mass comprising, the chassis frame and power plant between the wheel suspension-chassis insulators 33, 28' and the chassis-body insulators 23. This mass suspended, as above described, aids in suppressing both high frequency and audible vibrations.

Referring now to the rear chassis shown in Figures 10 to 14 inclusive, on the frame 50 thereof is a front pair of laterally spaced, oppositely disposed connector members or hanger brackets 86. These hanger brackets 86 are preferably mounted on the lower flange of the front cross member 61 spaced inwardly from the side frame members 60. Rivets or other suitable securing means may be provided to secure the hanger brackets 86 to the frame cross member 62. A pair of connector members or hangers 87 carried by the underbody frame rear extensions 72 cooperate respectively with the chassis frame hangers 86 to connect the frames together with the resilient rubber insulators 23 interposed therebetween. At the rear end of the rear chassis frame, laterally and oppositely disposed connector members or hangers 88 are preferably secured to the web of the rear cross member 62 for cooperative connection with plate-like hanger extensions 90, secured to the rear ends of the frame extensions 72 (see Fig. 12). The sleeves, bolts, nuts, etc. of the rear chassis body frame connections being the same as those previously described in connection with the front chassis, like parts are designated by like numerals to avoid unnecessary repetitious description. Similar to the arrangement of the front chassis 20, I have provided for the rear chassis frame 50 to function as a vibration insulator mass to suppress both high frequency and audible vibrations, originating at the wheels. This is accomplished by suspending the rear chassis frame 50, as above described between the spring insulators 54' and the frame insulators 23.

It will now be seen that the relatively long underbody frame 65 and the relatively short chassis frames 24 and 50 when connected together in the manner described above, constitute an articulated frame. The front and rear chassis frames are made of relatively heavy gauge sections; whereas the underbody frame 65, without sacrificing needed rigidity, may be made of relatively light gauge metal, thus effecting an appreciable saving in weight and consequently in cost of the vehicle. Also, the underbody frame side members 66 may be made straight and parallel as viewed in the plan view of Figure 1, thus effecting a saving in cost of fabrication of these members. In both the front and rear chassis frames, the side frame members 38 between front and rear insulators 23 constitute resiliently mounted torque or radius members opposing turning of the cross members 39 and 62.

Figure 2:
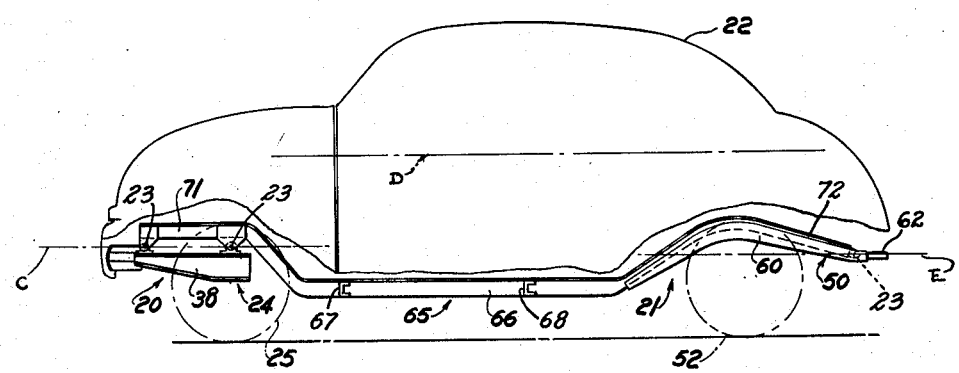
Figure 2 is a side elevational view of the motor vehicle having portions thereof broken away to show certain features of its construction.
Figure 3:
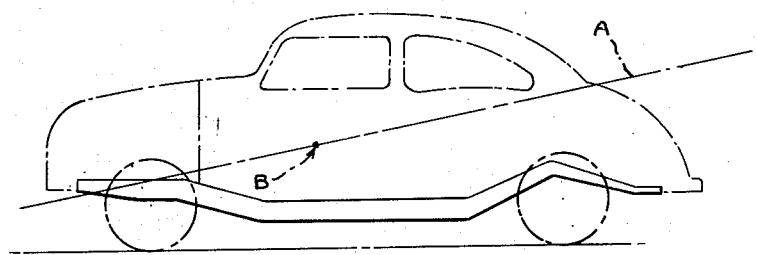
Figure 3 is a side elevational view of a conventional type of motor vehicle shown for purposes of comparison with features of the present invention.

In motor vehicles having conventional chassis frames and closed bodies, the torsional axis A of the vehicle is approximately as indicated in Figure 3, the axis A sloping upwardly from front to rear of the vehicle. When one wheel of this vehicle is displaced vertically by encounter with road irregularities, there is torsional deformation of the frame and body about the torsional node B. Sometimes this is accompanied by lateral vibrations which occur when the ground wheels engage a so-called washboard road, such vibrations, of course, being transmitted to the body through the single chassis frame. In comparison to the conventional motor vehicle, it will be seen, in Figure 2, that in my motor vehicle the front chassis 20, rear chassis 21 and body 22 have separate or individual torsional axes C, D and E respectively. This is due to the articulated construction of the vehicle which permits limited movement of the front chassis, rear chassis and body relative to each other. The insulators 23 dampen vertical, lateral and torsional vibrations of the front chassis and of the rear chassis so that such vibrations are neither fully transmitted to the body nor to each other thereby providing a motor vehicle having improved riding qualities. Also, the insulators 23 dampen transmission of high frequency vibrations giving rise to noise in the body.

A hood or bonnet 92 enclosing the power plant is hinged to the body, as at 93. Any suitable type of hinge may be used. In order to avoid having obstructions between the extended frame members 71, to the wheeling of the front chassis unit therebetween at assembly, I latch the bonnet 92 to the chassis frame 24. To this end, a bracket 94 secured to the front cross member 40 of the front chassis is provided with a hole to receive a spring pressed lock bolt 95 carried by a reinforced portion of the hood 92 at the centerline of the car. A spring pressed catch or keeper member 96 pivoted to the bracket 94 is provided for releasably holding the lock bolt 95 in locked position. In order that oscillations of the front chassis frame 24 may not be transmitted to the hood, the latch 95 is located substantially on the front frame torsional axis.

Referring now to the modification of Figs. 15 and 16 inclusive, the vehicle shown is similar to the above described motor vehicle and therefore like parts are designated by like numerals. In the modification, relatively soft, rubber insulators 97 are used so as to obtain greater relative movement between the body and the chassis units and dampeners, preferably shock absorbers 98 are provided to dampen the vibrations. The shock absorbers 98 may be of the self-constained hydraulic type or may be of any other suitable type. At the front of the vehicle (see Fig. 15), oppositely disposed brackets 99 are secured respectively to the body frame extensions 71, adjacent and above the rear cross member 39 of the front chassis frame. A pair of the shock absorbers 98 are respectively pivoted, as at 100, adjacent ends thereof to the brackets 99. To each of the other ends of the shock absorbers 98 is connected respectively, extension connecting rods 101, these rods 101 extending diagonally in crossed relation. The rods 101 are pivotally connected at their lower ends to brackets 102 which are secured to the lower front chassis frame rear cross member 39, adjacent the frame side members. As shown in Figure 16, another pair of the shock absorbers 98 are arranged and connected to the body frame and rear chassis frame similarly to the above described front shock absorbers 98 and therefore similar parts are designated by like numerals to avoid unnecessary repetitious description. By arranging the shock absorbers so that they act at angles transversely of the vehicle, it will be seen that they not only dampen torsional vibrations, but also dampen vertical and lateral vibrations to the extent that such vibrations act in the directions of the components of force of action of the shock absorbers.

From the foregoing description, it will now be appreciated that I have provided an improved motor vehicle which has improved riding qualities, yet is of low cost both in respect to manufacture and operation thereof. Improved riding qualities of the vehicle are obtained by the provision of a front chassis, a separate rear chassis and a body connected together as an articulated structure through vibration insulators. It is to be understood that the vehicle may be constructed having either the front and/or the rear chassis rigid with the body. However, for best riding qualities, the vehicle should have both relatively movable front and rear chassis insulated from the body. Also, I have provided for the arrangement of the front and rear chassis frames so that they function, due to their masses, as audible vibration insulators by suspending the frames between series of resilient insulators. This articulated construction makes it possible to reduce the weight of the underbody frame without sacrificing rigidity, thus effecting a saving in cost of manufacture and in operation of the vehicle. Also, the articulated structure makes it possible to sub-assemble the front chassis and rear chassis which entails a saving in manufacturing costs over production line assembly thereof. With the body on jacks, or other suitable supports, the front and rear chassis may be readily wheeled into place between the forwardly and rearwardly extended body frame members and be readily connected thereto, thus reducing assembly costs. This makes it advantageous to ship the vehicle disassembled in the three main units to assembly plants or to dealers, effecting a further saving in costs of the vehicle.

Although preferred and modified forms of the invention have been illustrated and described in detail, it will be apparent to those skilled in the art that various other modifications may be made therein without departing from the spirit of the invention or from the scope of the appended claims.

1. In a motor vehicle, an underbody frame including a pair of laterally spaced rigid frame members having upwardly offset end portions, a wheel suspension frame including a pair of laterally spaced rigid frame members, the wheel suspension frame being disposed adjacent to said offset end portions of the underbody frame with the frame members of the supension frame respectively and directly beneath said offset end portions, universally yieldable rubber members interposed between said end portions of said offset end portions of said underbody frame members and the frame members of the wheel suspension frame and being spaced longitudinally of the frame members, attaching members attaching the underbody frame and the wheel suspension frame together solely at said universally yieldable rubber members, ground wheels, suspension means for each side of said vehicle, each suspension means comprising upper and lower links connected to a corresponding one of said ground wheels and to said wheel suspension frame, torsional rubber members interposed between and connecting each of said links to said wheel suspension frame.

2. In a motor vehicle, an underbody frame including a pair of laterally spaced rigid frame members each having an offset forward portion, a chassis frame including a pair of laterally spaced rigid frame members directly beneath and extending in parallel longitudinal relationship with said underbody frame, a ground wheel on each side of said vehicle, upper and lower links connected to each of said ground wheels and to said chassis frame, torsional rubber members interposed between and connecting said links to said chassis frame, rubber mountings spaced longitudinally and interposed between said offset portion of said underbody frame and said chassis frame, attaching members attaching said underbody frame and said chassis frame together solely at said rubber mountings, an engine mounted on said chassis frame, and engine rubber mountings interposed between said chassis frame and said engine.

CLYDE R. PATON.

REFERENCES CITED

The following references are of record in the file of this patent:

UNITED STATES PATENTS

| Number | Name | Date |
|---|---|---|
| 868,749 | Apple | Oct. 22, 1907 |
| 939,158 | Palmer | Nov. 2, 1909 |
| 1,293,796 | Kenrick | Feb. 11, 1919 |
| 1,725,015 | Olson | Aug. 20, 1929 |
| 1,813,757 | Ogden, Jr. | July 7, 1931 |
| 1,934,892 | Tea | Nov. 14, 1933 |
| 1,948,745 | Curtis | Feb. 27, 1934 |
| 2,005,838 | Bartlett | June 25, 1935 |
| 2,011,235 | Trott | Aug. 13, 1935 |
| 2,013,599 | Butler | Sept. 3, 1935 |
| 2,020,597 | Appel | Nov. 12, 1935 |
| 2,047,336 | Stout | July 14, 1936 |
| 2,058,580 | Evans | Oct. 27, 1936 |
| 2,074,158 | Avery | Mar. 16, 1937 |
| 2,208,709 | Tjaarda | July 23, 1940 |
| 2,226,406 | Krotz | Dec. 24, 1940 |
| 2,237,056 | Manning | Apr. 1, 1941 |
| 2,253,645 | Paton | Aug. 26, 1941 |
| 2,299,900 | Jackson | Oct. 27, 1942 |
| 2,345,201 | Krotz | Mar. 28, 1944 |

FOREIGN PATENTS

| Number | Country | Date |
|---|---|---|
| 250,141 | Italy | Sept. 16, 1926 |